C. A. WINN.
ROLLER BEARING RETAINER AND SPACER.
APPLICATION FILED JAN. 30, 1917.

1,261,199.

Patented Apr. 2, 1918.

Inventor
Charles A. Winn
By Brown, Hanson & Battche
Attorneys

UNITED STATES PATENT OFFICE.

CHARLES A. WINN, OF CHICAGO, ILLINOIS, ASSIGNOR TO CHICAGO BEARINGS COMPANY, OF CHICAGO, ILLINOIS, A CORPORATION OF ILLINOIS.

ROLLER-BEARING RETAINER AND SPACER.

1,261,199.   Specification of Letters Patent.   Patented Apr. 2, 1918.

Application filed January 30, 1917. Serial No. 145,525.

*To all whom it may concern:*

Be it known that I, CHARLES A. WINN, a citizen of the United States, residing at Chicago, in the county of Cook and State of Illinois, have invented a certain new and useful Improvement in Roller-Bearing Retainers and Spacers, of which the following is a full, clear, concise, and exact description, reference being had to the accompanying drawings, forming a part of this specification.

The present invention relates to roller bearings and has particular reference to new and useful improvements in roller retainers and spacers.

The primary object of my invention is to provide a novel and improved form of retaining ring for association with the bearing members of a roller bearing for spacing the same when in the bearing and to retain the same when removed from the bearing.

In the devices heretofore designed rings have been provided having openings therein to receive the bearing members. In most of these prior devices no effective provision is made for distribution of the strain between bearing members. Hence, as soon as a bearing member would begin to disaline its axis with the axis of the shaft upon which the bearing is mounted said bearing member would commence to ride upon the ring and after undue wear on the parts the same would climb on to the ring, thereby either completely destroying the ring or otherwise disabling the bearing. This climbing of the bearing member, particularly prevalent in roller bearings is primarily caused by disposing the ring or retaining annulus with its plane out of alinement with the line of travel of the roller axes, hence tending to assist the rollers in climbing action. The climbing action may act inwardly as well as outwardly and therefore the correct position of the ring relative to bearing member should be exactly in alinement with points on the roller in alinement with the line of travel of the bearing member or roller axes.

My invention has been designed particularly with the error of construction as noted in mind, and the principal feature of my invention resides in the disposition of the line of ring and roller contact in alinement with axis travel of the roller whether the latter be tapering, cylindrical or otherwise.

This feature is the underlying principle of my invention and that upon which I lay particular stress.

My invention also embodies means to peripherally strengthen the retainer against buckling.

Therefore, a further object of my invention is to embody in a compact, simple and durable structure the principle set forth in the foregoing whereby to provide a roller bearing which is simple in construction, cheap to manufacture, quickly and easily assembled and effective and economical in operation.

A still further object of my invention is to provide a retainer ring for use in roller bearings and the like which while eliminating in a large degree the friction between the roller and the margins of the opening in which the same is mounted does provide a sufficient area of contact between the peripheral surface of the roller and the margins of the opening to prevent the climbing referred to hereinbefore. Retaining members are combined but only exercise their function when the ring is removed from the bearing or when absolutely necessary to prevent climbing of the rollers.

Other objects and advantages to be derived from the use of my improved roller spacer and retainer will appear from the following detailed description and the claims, taken with an inspection of the accompanying drawings, in which—

Figure 1:
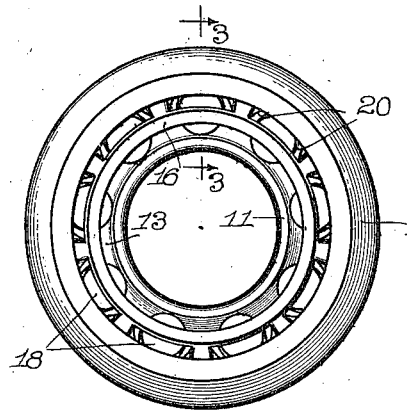
Figure 1 is an elevational view of one end of my improved bearing.
Figure 2:
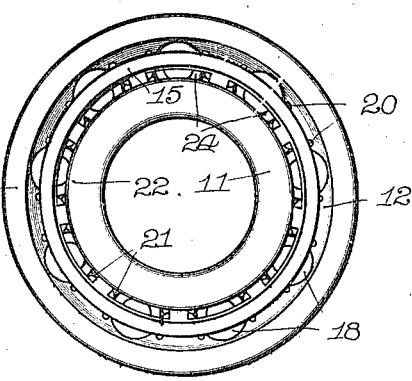
Fig. 2 is a similar view of the opposite end thereof.
Figure 4:
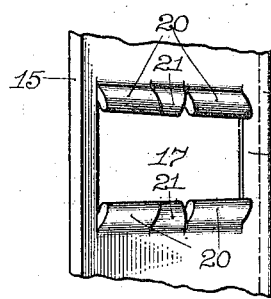
Fig. 4 is an enlarged fragmental perspective of the retaining and spacing ring, showing one opening and the retaining tongues.

Referring more particularly to the drawing, wherein similar characters of reference designate like and corresponding parts throughout the various views, 10 designates the cup of a bearing and 11 designates the cone. Although I do not limit myself to the detailed structure, as shown, I have illustrated the opposed annular surfaces 12 and 13, respectively, of the cup and cone as angularly related, so that the annular space between said cup and cone is tapering in cross-section to conform to the peripheral surfaces of the bearing members hereinafter described.

The retaining element of my invention preferably comprises an annulus or ring 14, said ring being substantially frusto-conical in cross-section, the larger end thereof being provided with an outwardly directed annular flange 15, and the inner end provided with a similar flange 16 inwardly directed. The flanges are provided for the purpose of strengthening the ring and preventing distortion of the same under excess strain. While the ring shown is frusto-conical in cross-section, it is of course to be understood that I do not limit myself to this shape of ring since the same may be simply cylindrical, hexagonal or any convenient shape.

The ring 14 is provided at suitable distances with a plurality of openings 17, in the present instance rectangular and slightly tapering, to receive the bearing members, in the present instance tapering rollers 18.

Figure 3:
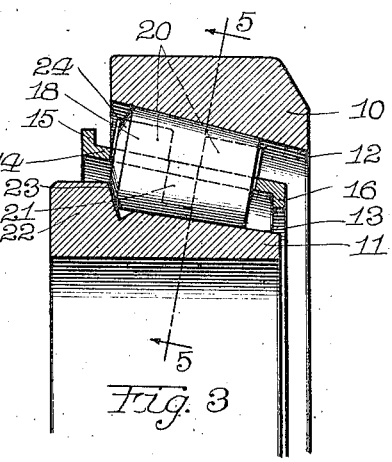
Fig. 3 is an enlarged fragmental section taken on the line 3—3, of Fig. 1.
Figure 5:
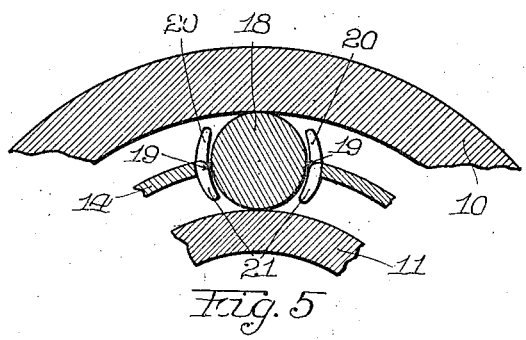
Fig. 5 is an enlarged fragmental section taken on the line 5—5, of Fig. 3, looking in the direction of the arrows.

As clearly illustrated in Figs. 3 and 5, the axis of the roller is in alinement with the margin of the opening in the ring, contact, if any, of the peripheral surface of the roller with the margins being had only at the points 19, said points being in alinement with the travel line of the roller axis. This arrangement insures an even distribution of the stress upon the spacing ring 14 as well as delivering said stress through the metal of the ring between two rollers on a line instead of tangentially of the ring as often occurs in the previous devices. The surfaces of the side walls of the openings 17 are sufficiently wide to provide a firm bearing surface so that there is actually no point or line contact, but sufficient area is provided to prevent the cylinder or roller from riding upon the ring. In the appended claims I describe the position of the rollers with respect to the ring by stating that the axes of the rollers lie substantially in line with the generatrix of the conical ring. By this I intend to convey the meaning that the parts are so located with respect to each other that the marginal edge of the opening of the rings bears substantially upon the central part of the rollers so that there is little or no tendency for the rollers to climb on the ring or to roll under the ring.

When the ring and rollers are withdrawn from the bearing it is desired that some means be provided for retaining the rollers against displacement so that the rollers and ring may be handled as a unit. For this purpose I have provided the lips 20 and 21, the former being arranged in pairs, and the latter located between the lips of each pair. The lips 20 and 21 are formed from the sheet of metal from which the ring 14 is formed, the lips 20 being bent outwardly and the lips 21 inwardly. This is done because the greater strain is on the outer lips and therefore it is preferable that the same be larger. As will be apparent from Fig. 5, the lips 20 and 21 are curved, but the curvature of the same is formed on a greater radius than that of the roller 18. In this manner the roller does not actually contact with the lips 20 and 21 except when the ring is withdrawn from the bearings or when the roller attempts to ride out of its opening. Thus, in the event that one end of a certain one of the rollers should tend to travel faster than the opposite end first said end would immediately abut the adjacent margin of its opening in advance of said roller. In this way it is not possible for the roller to obtain any leverage sufficient to distort the ring and cause the same to buckle. The margin of the opening being in alinement with the line of travel of the roller axis is practically in continuous contact with the peripheral surface of the roller when in the bearing, and should the roller attempt to climb or under-ride the ring, either the lips 20 or 21 would arrest the same.

The length of the lips is such that should the same become bent by the roller there would exist a space between the race and the end of the lip, thereby obviating any riding of the roller.

In order to accommodate end thrusts in a large degree I provide an annular outstanding flange 22 formed integrally with the cone 11, the inner surface of said flange being beveled as at 23 to engage the beveled surfaces 24 of the rollers 18.

From the foregoing description the advantages and novelty of my improved retainer will be readily apparent, there being no unnecessary expensive parts embodied, and while I have shown and described a specific structure I do not limit myself to the same but desire to make such changes therein as do not depart from the spirit and scope of the invention as claimed.

I claim:

1. In combination, a retainer comprising a ring having a plurality of openings therein, a plurality of bearing members receivable in the openings, the margins of the openings having a plurality of curved tongues arranged thereon, the curvature of said tongues being of less degree than that of the rollers so that the tongues do not come into actual contact with the rollers until the ring is removed from a bearing.

2. In combination, a retainer comprising a ring having a plurality of openings therein, a plurality of bearing members receivable in the openings, the margins of the openings engaging the bearing members along lines in alinement with the line of travel of the roller axes, a plurality of oppositely directed tongues along the margins of said openings, said tongues being curved on radii greater than that of the rollers, and peripheral strengthening means for said ring.

3. In a bearing, the combination of inner and outer races, a frusto-conical ring disposed therebetween and having a plurality of tapering openings therein, tapering bearing rollers in said openings, curved retaining lips along the margins of said openings, the axes of the rollers lying substantially in line with the generatrix of the conical ring, and the curvature of said lips being of less degree than that of the peripheral surfaces of said rollers, whereby when the ring and rollers are assembled with the races, the points of contact between the rollers and the margins of the openings will be reduced so as to prevent undue friction between the rollers and said margins.

4. In combination, a ring having a plurality of openings therein to receive anti-friction bearing members, the relation of the ring and bearing members being such that the margins of the openings are in substantially the same cylinder as the axes of the bearing members, means disposed on the ring adjacent the openings to act as retaining means for the rollers when the ring is withdrawn from the bearings, said means not acting upon the rollers when the same are in a bearing.

5. In combination, a cylindrical ring having a plurality of openings therein, a plurality of rollers receivable in said openings, the path of travel of the roller axes being in alinement with the margins of the openings, a plurality of oppositely arranged tongues along the margins of the openings and integral with the ring, said tongues being curved to a degree less than the curvature of the rollers, to retain the same when removed from a bearing and to reduce the area of contact when in use in a bearing.

In witness whereof, I hereunto subscribe my name this 23rd day of January, A. D. 1917.

CHARLES A. WINN.